(12) United States Patent
Baker et al.

(10) Patent No.: US 6,846,257 B2
(45) Date of Patent: Jan. 25, 2005

(54) SERIES DRIVE CLUTCH

(75) Inventors: Richard D. Baker, Ypsilanti, MI (US); Russell E. Monahan, Ann Arbor, MI (US); Richard Jacobson, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/316,668

(22) Filed: Dec. 11, 2002

(65) Prior Publication Data

US 2004/0116226 A1 Jun. 17, 2004

(51) Int. Cl.$^7$ ................................................ F16H 3/72
(52) U.S. Cl. ......................... 475/5; 475/204; 475/207; 192/31; 192/38
(58) Field of Search ............................ 475/5, 204, 207; 192/31, 38

(56) References Cited

U.S. PATENT DOCUMENTS

| 3,861,484 | A | * | 1/1975 | Joslin ........................ 180/65.2 |
| 4,531,620 | A | * | 7/1985 | Stone ........................... 192/45 |
| 5,307,911 | A | * | 5/1994 | Robinson ...................... 192/31 |
| 5,743,350 | A | * | 4/1998 | Yamawaki et al. ......... 180/444 |
| 6,000,512 | A | * | 12/1999 | Cronin et al. ................. 192/38 |
| 6,234,769 | B1 | * | 5/2001 | Sakai et al. .................. 417/374 |
| 6,257,386 | B1 | * | 7/2001 | Saito et al. ................ 192/48.2 |
| 6,425,838 | B1 | * | 7/2002 | Matsubara et al. ............ 475/5 |
| 6,588,559 | B2 | * | 7/2003 | Blair ............................ 192/20 |
| 6,622,837 | B2 | * | 9/2003 | Ochab et al. ................. 192/35 |
| 6,652,407 | B2 | * | 11/2003 | Ronk et al. ................. 475/204 |
| 6,684,992 | B2 | * | 2/2004 | Goto et al. ................... 192/35 |
| 2002/0170795 | A1 | * | 11/2002 | Yasui et al. ................... 192/35 |
| 2003/0078134 | A1 | * | 4/2003 | Kojima et al. ................. 477/3 |

OTHER PUBLICATIONS

Automotive Engineering International, Toyota Prius: Best Engineered Car of 2001, Dec. 2001.

* cited by examiner

Primary Examiner—Rodney H. Bonck
Assistant Examiner—David D. Le
(74) Attorney, Agent, or Firm—Brinks Hofer Gilson & Lione (57) ABSTRACT

A clutch mechanism is disclosed for use with a hybrid electric vehicle wherein the electric motor-generator and engine are arranged in a series configuration. The clutch mechanism is positioned between and in communication with the electric motor-generator and engine to allow for either direct drive or a predetermined gear ratio between the electric motor-generator and engine. The electric motor-generator is preferably an integrated electric motor and generator. The engine is preferably a combustion engine.

17 Claims, 8 Drawing Sheets

SERIES DRIVE CLUTCH

BACKGROUND OF THE INVENTION

Hybrid electric vehicles ("HEV") are known to include two power sources to drive the vehicle. It is known to use an electric motor in combination with a combustion engine. In a so-called parallel hybrid system, the two power sources either operate individually or simultaneously. Therefore, there is a need for a mechanism to be positioned between the two power sources to allow for either or both power sources to drive the vehicle.

Further, when the vehicle is idling there are competing requirements. The first is to provide minimum power output from the engine to reduce fuel consumption and emissions from the vehicle. On the other hand, the second is to provide enough power for desired vehicle accessories. For instance, the heater, rear defroster and radio may all be on while the vehicle is idling.

BRIEF SUMMARY OF THE INVENTION

The present invention addresses these requirements by providing an electrically actuated bi-directional roller clutch that is connected to the vehicle's electric motor-generator and engine. The electrically actuated bi-directional roller clutch is installed on the output shaft of the electric motor-generator and mated to a planetary gearset in such a manner that the output of the planetary gearset may vary between direct drive and some other predetermined ratio. A one-way clutch is integrated into the ring gear of the planetary gear such that it passively prevents reversing ring gear rotation as needed to achieve the proper gear ratio. Control logic will signal actuation of the bi-directional roller clutch as needed to permit the electric motor-generator to be used to either provide supplemental power to drive the vehicle, start the combustion engine, charge the vehicle's electric system, or provide regenerative braking during vehicle deceleration.

DETAILED DESCRIPTION OF THE INVENTION

Figure 1:
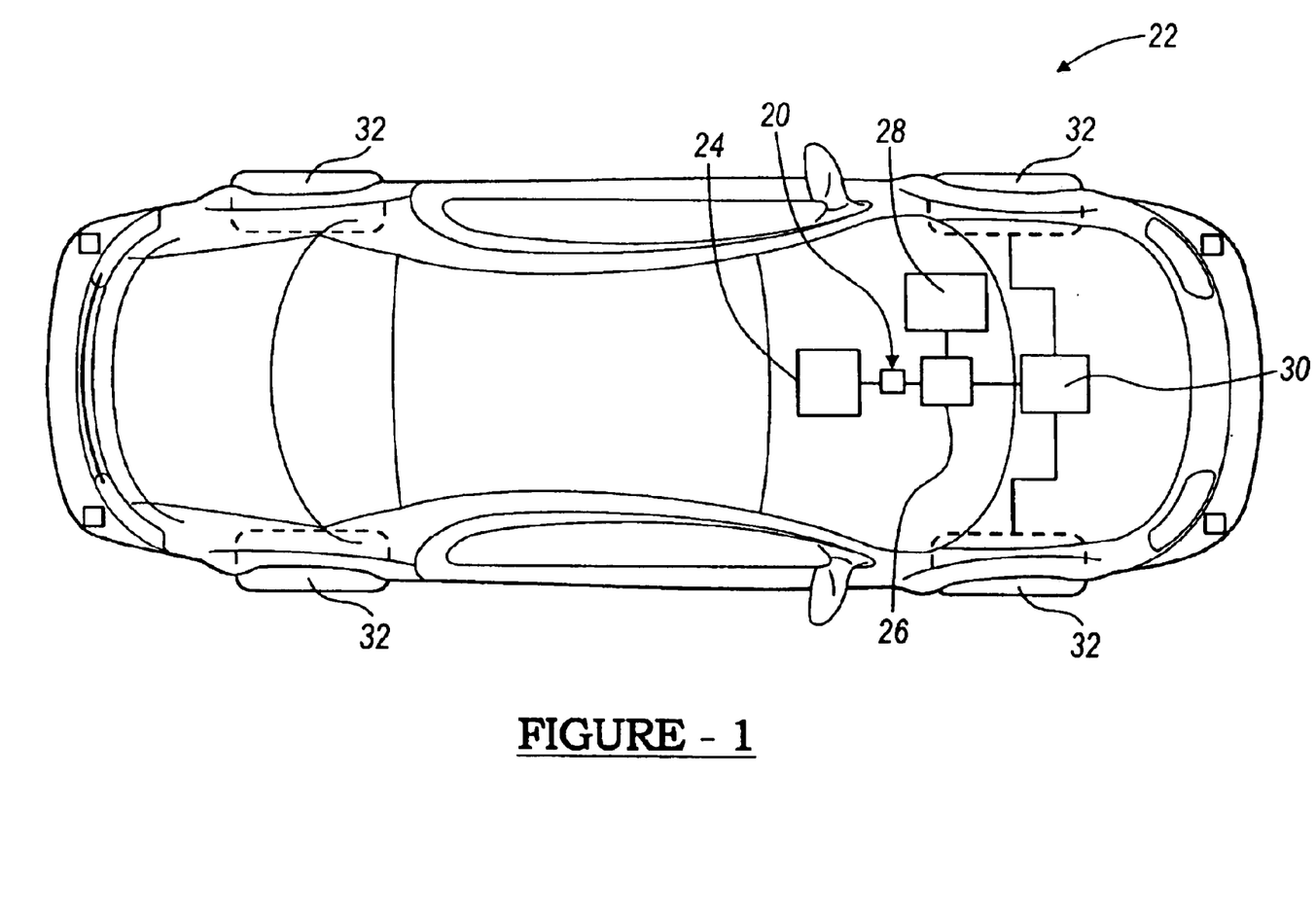
FIG. 1 is a top view of the present invention installed in a vehicle.

As shown in FIG. 1, the clutch mechanism of the present invention, shown generally at 20, is preferably used on a hybrid electric vehicle ("HEV"), shown generally at 22, in which the engine 24 and electric motor-generator 26 are arranged in a series configuration. The clutch mechanism 20 is positioned between the engine 24 and the electric motor-generator 26. The clutch mechanism 20 allows for either direct drive or some other predetermined gear ratio between the electric motor-generator 26 and the engine 24.

The electric motor-generator 26 is preferably an integrated electric motor and generator. The engine 24 is preferably a combustion engine and more preferably an internal combustion engine. However, any other type of engine could be used with the clutch mechanism 20 of the present invention, including but not limited to, a steam engine, a Stirling cycle engine, or a gas turbine engine.

The engine 24 and the electric motor 26 are two separate power sources that can be used to drive the transmission 30 of the vehicle 22. Either the engine 24 alone or the engine 24 and the electric motor-generator 26 together can drive the vehicle 22. The transmission 30 transmits power to the wheels 32 that are driving the vehicle 22. In a front-wheel drive vehicle, the transmission transmits power to the front wheels. In a rear-wheel drive vehicle, the transmission transmits power to the rear wheels.

In the present invention, preferably an electric motor-generator 26 with a smaller output capacity than the engine 24 is used. In other words, the amount of power output that the electric motor-generator 26 is capable of providing is smaller than the amount of power output that the engine 24 is capable of providing. A smaller electric motor-generator 26 is preferred because of energy efficiency, size, cost and weight considerations. Further, the physical configuration of the clutch mechanism 20 does not provide for a complete disconnect between the electric motor-generator 26 and the engine 24. Therefore, the electric motor-generator 26 cannot be used as the sole driving force of the HEV 22.

Figure 2:
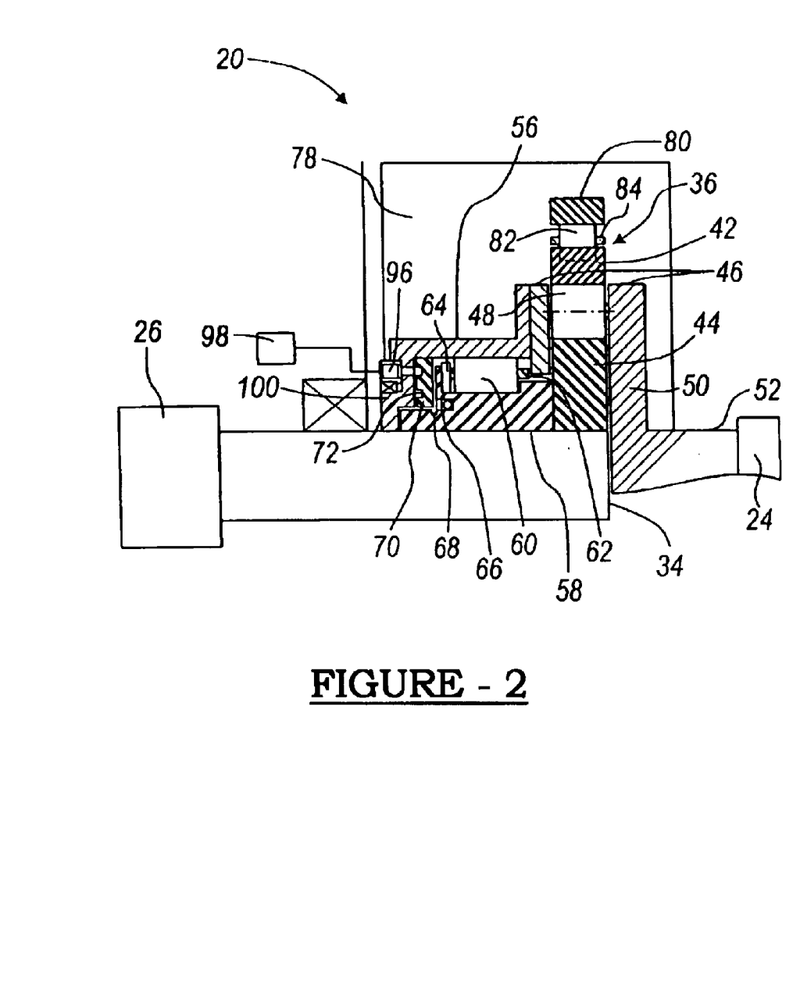
FIG. 2 is a radial half-section view of a first embodiment of the present invention.
Figure 3:
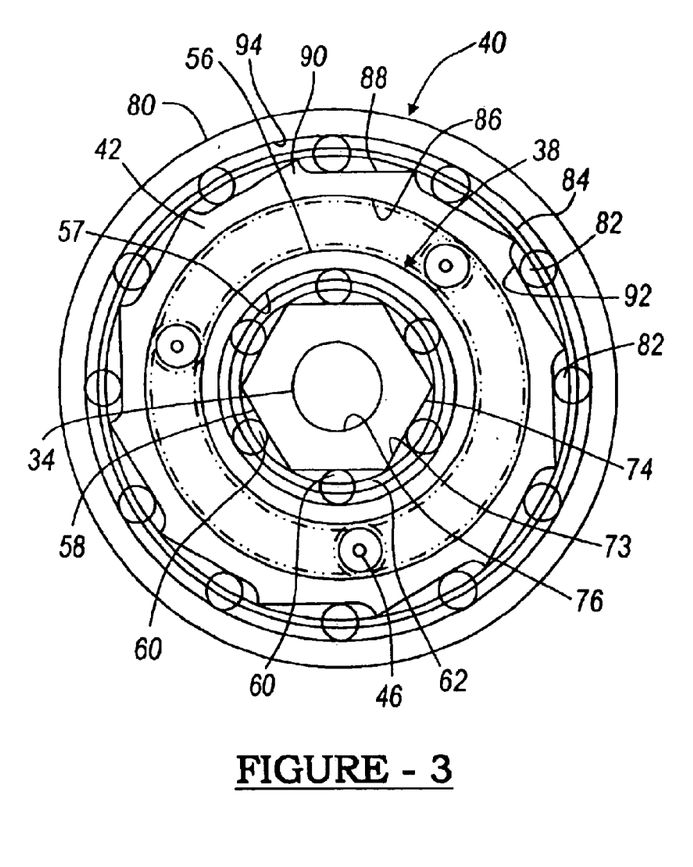
FIG. 3 is an axial view of the two-way clutch and the one-way clutch of the first embodiment of the present invention.

As shown in FIGS. 2 and 3, the components of the clutch mechanism 20 include a planetary gearset, shown generally at 36, a bi-directional roller clutch, shown generally at 38, installed on the output shaft 34 of the electric motor 26 and mated to the planetary gearset 36, and a one-way clutch, shown generally at 40, integrated into the ring gear 42 of the planetary gearset 36. The planetary gearset 36 is connected to an output shaft 52 of the engine 24.

The clutch mechanism 20 can be designed for various gear ratios between the electric motor 26 and the engine 24. A gear ratio is determined by the diameter and number of teeth for each gear in the planetary gearset 36. A single clutch mechanism is designed to have one predetermined gear ratio. The preferred predetermined gear ratio for the present invention is 3:1 (three to one).

When the clutch mechanism 20 is disengaged there is a speed reduction from the electric motor-generator 26 output to the engine 24 input. In other words, for the preferred gear ratio the electric motor-generator 26 is rotating three times faster than the engine 24. There is a speed increase when the engine 24 is driving the electric motor-generator 26 with the clutch 20 disengaged.

When the clutch mechanism 20 is disengaged and the engine 24 is stopped, the electric motor-generator 26 can crank the engine 24 through the clutch mechanism 20 with a speed reduction/torque multiplication of a preset ratio. In this operating mode, the electric motor-generator 26 causes the engine 24 to crank start or turn over.

When the clutch mechanism 20 is disengaged and the engine 24 is firing, the clutch mechanism 20 is driven by the engine 24. The engine 24 overdrives the electric motor-generator 26 at the inverse of the preset ratio, thus providing additional driving speed and allowing more efficient generation of electrical power especially at low engine speeds like idle. In this operating mode, the electric motor-generator 26 acts as a generator and charges the vehicle's electrical system and charges the battery 28.

When the clutch mechanism 20 is engaged, there is a direct drive output, resulting in no speed reduction or speed increase between the electric motor-generator 26 and the engine 24. In other words, the planetary gearset 36 is locked up resulting in a preset drive ratio of 1:1. Therefore, the engine 24 can drive the electric motor-generator 26. As a result, the electric motor-generator 26 will provide supplementary motive power to the vehicle 22 during periods of peak acceleration. Additionally, the motor-generator 26 will provide regenerative braking during vehicle deceleration while also using engine braking.

Figure 4:
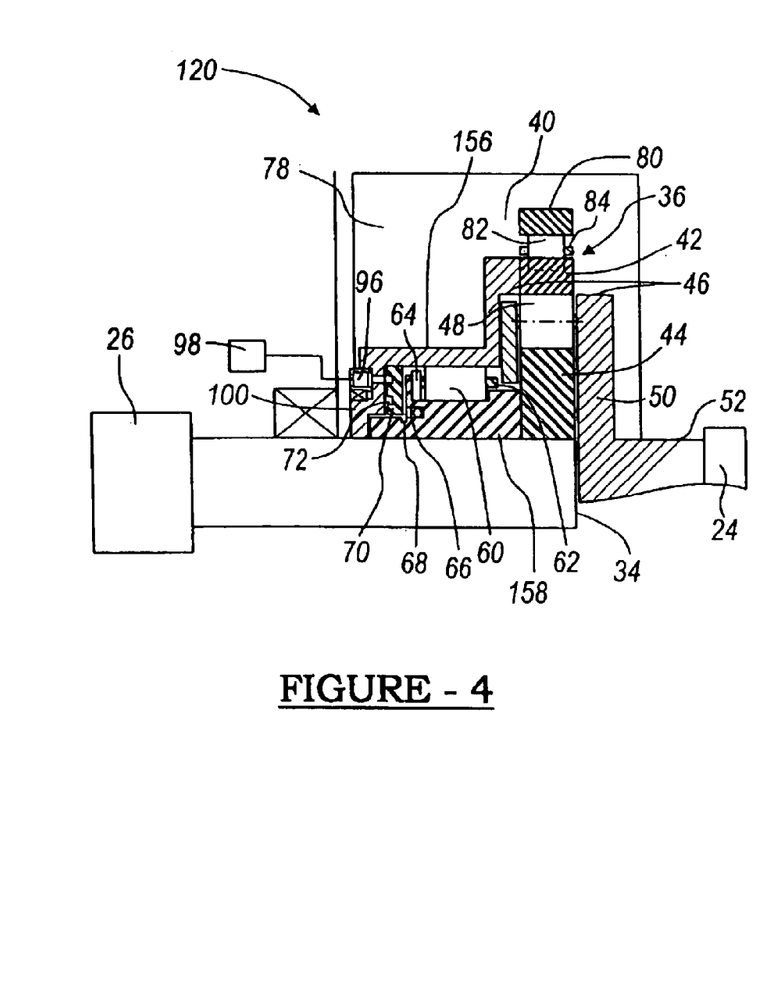
FIG. 4 is a radial half-section view of a second embodiment of the present invention.
Figure 5:
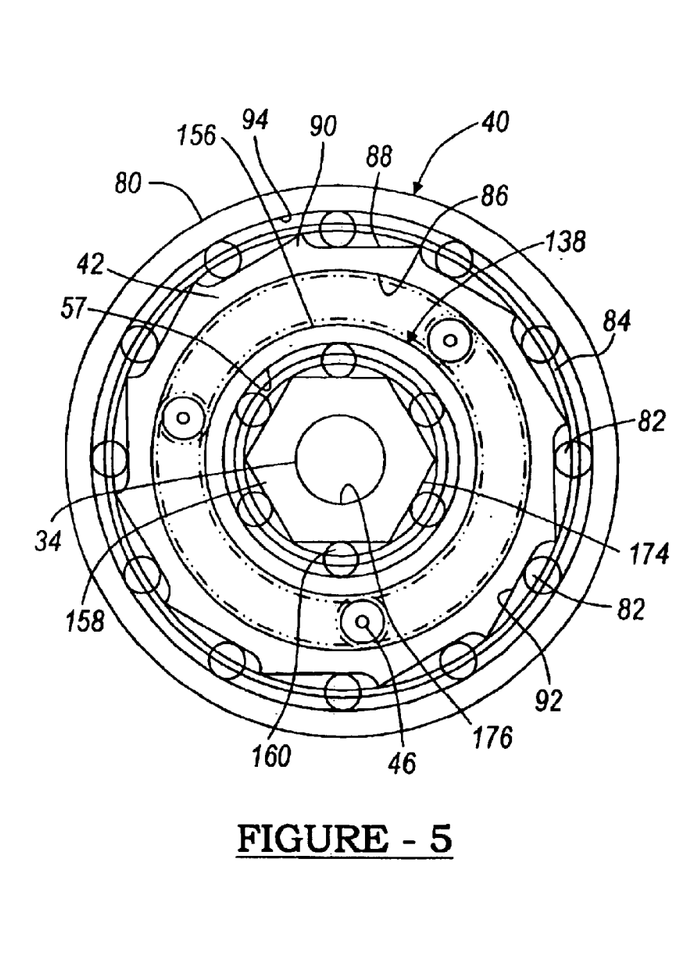
FIG. 5 is an axial view of the bi-directional clutch and the one-way clutch in the second embodiment.
Figure 6:
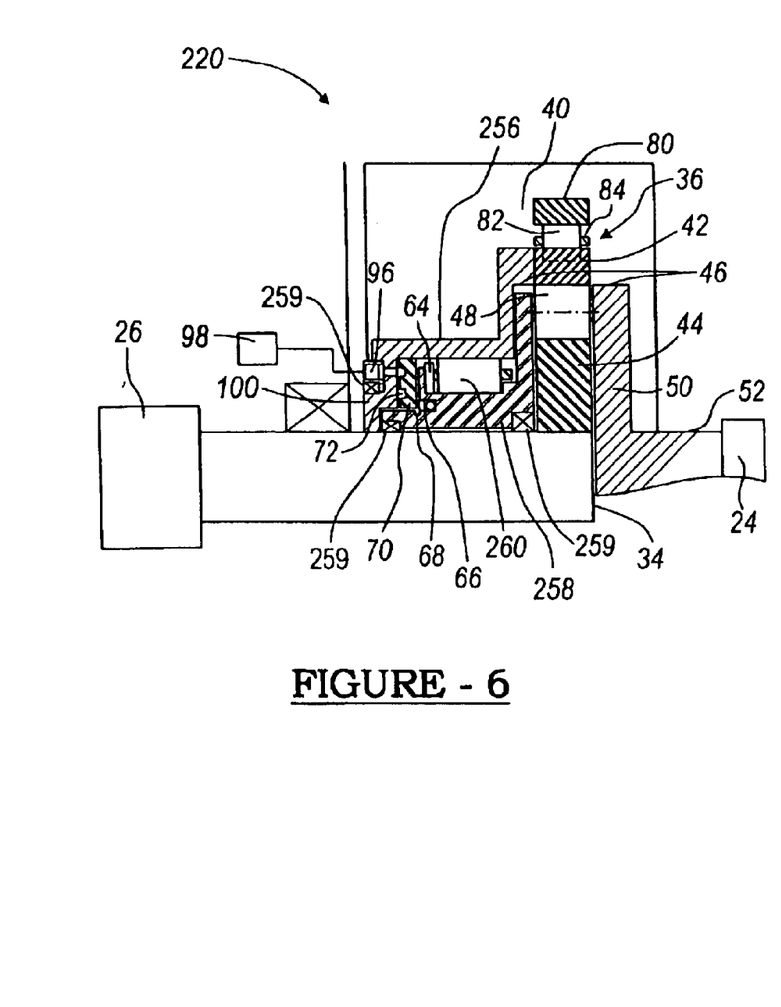
FIG. 6 is a radial half-section view of a third embodiment of the present invention.
Figure 7:
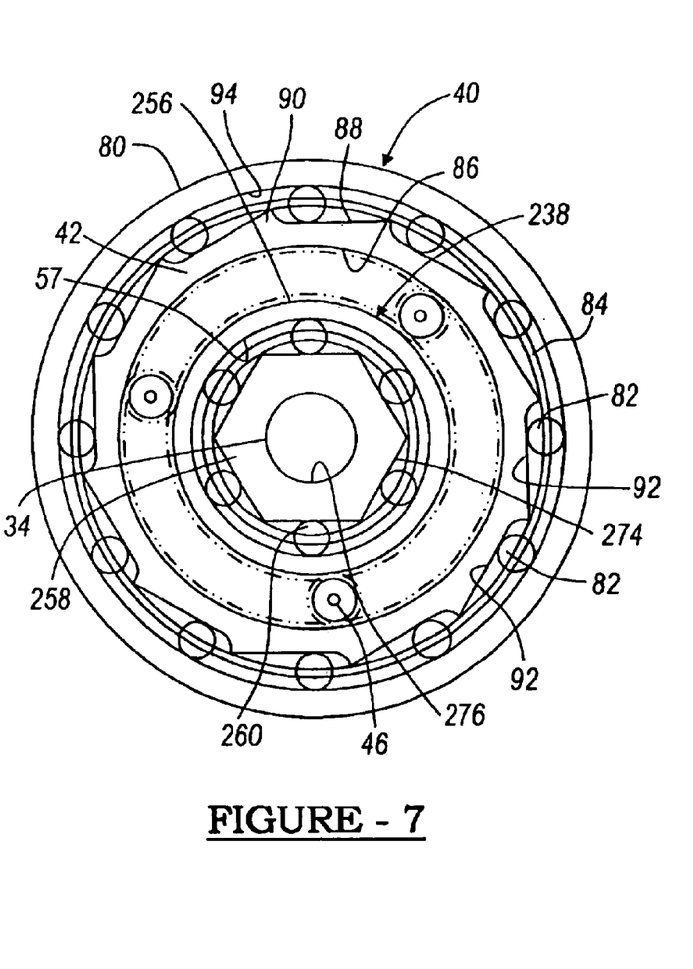
FIG. 7 is an axial view of the bi-directional clutch and the one-way clutch in the third embodiment.

There are three different embodiments of the clutch mechanism 20, 120, 220. In the first embodiment, the bi-directional roller clutch 38 links the sun gear 44 and the planet carrier 46 as shown in FIGS. 2 and 3. In the second embodiment, the bi-directional roller clutch 138 links the sun gear 44 and the ring gear 42 as shown in FIGS. 4 and 5. In the third embodiment, the bi-directional roller clutch 238 links the planet carrier 46 and the ring gear 42 as shown in FIGS. 6 and 7. For all three of the embodiments, the preferred gear ratio during disengagement of the clutch mechanism 20 is 3:1.

In all of the embodiments, the clutch mechanism 20 is positioned between and is in communication with the electric motor-generator 26 and the engine 24. More specifically, the clutch mechanism 20 is installed on the output shaft 34 of the electric motor-generator 26 and the output 50 of the clutch mechanism 20 is attached to the output shaft 52 of the engine 24. Further, the components of the clutch mechanism 20 are the same for each of the three embodiments. The only difference between the three embodiments is the physical attachment between the components.

FIGS. 2 and 3 illustrate the first embodiment in which the clutch mechanism 20 includes a bi-directional roller clutch 38, a planetary gearset 36 mated to the bi-directional roller clutch 38, and a one-way clutch 40 integrated into the ring gear 42 in the planetary gearset 36. More specifically, the bi-directional roller clutch 38 links or acts between the sun gear 44 and the planet carrier 46.

The planetary gearset 36 includes a sun gear 44, at least two planet gears 48, a planet carrier 46 and a ring gear 42. Preferably, there are three (3) planet gears 48. The sun gear 44 is connected to the output shaft 34 of the electric motor/generator 26. Each planet gear 48 is in contact with the ring gear 42 and the sun gear 44. The planet carrier 46 is attached to each of the planet gears 48 and links them all together. The planet carrier 46 is also in communication with the engine 24 via attachment to the engine's output shaft or crankshaft 52. The planetary gearset 36 may include an output shaft 50 that connects the planet carrier 46 to the crankshaft 52 of the engine 24.

Figure 11:
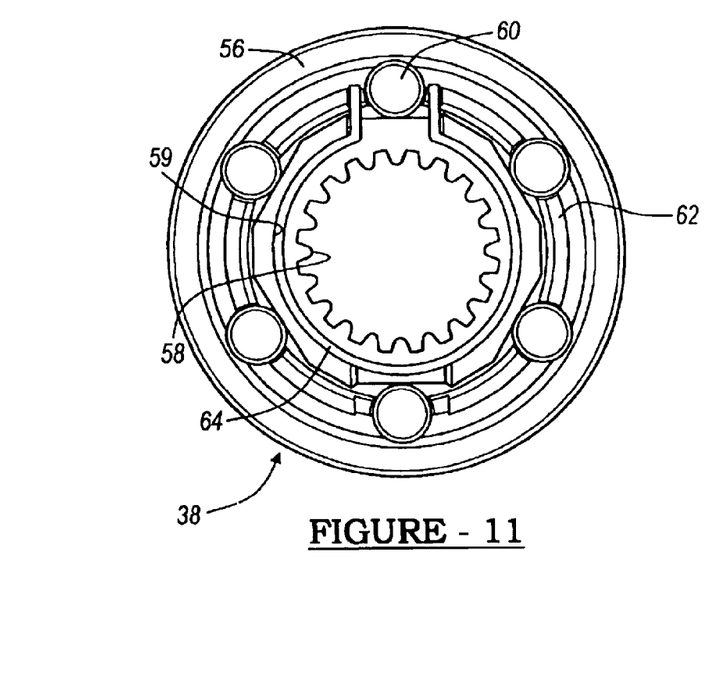
FIG. 11 is an axial view showing components of the bi-directional clutch in the disengaged mode.

The bi-directional roller clutch 38 includes a bi-directional clutch outer race 56 also referred to as an outer race 56, a bi-directional clutch inner race 58 also referred to as an inner race 58, a bi-directional clutch roller set 60 also referred to as a roller set 60, a bi-directional clutch roller cage 62 also referred to as a roller cage 62, a centering spring 64, an actuation disc 70 and a spring member 72. The centering spring 64 maintains the rotational position of the roller set 60. There is also a means 63 for axially positioning the centering spring 64. The means 63 may include, but is not limited to, a retaining washer 66 and a snap ring 68. The spring member 72 may include a wave washer. As shown in FIG. 11, the inner race 58 has a groove 59 for receiving the centering spring 64.

Figure 12:
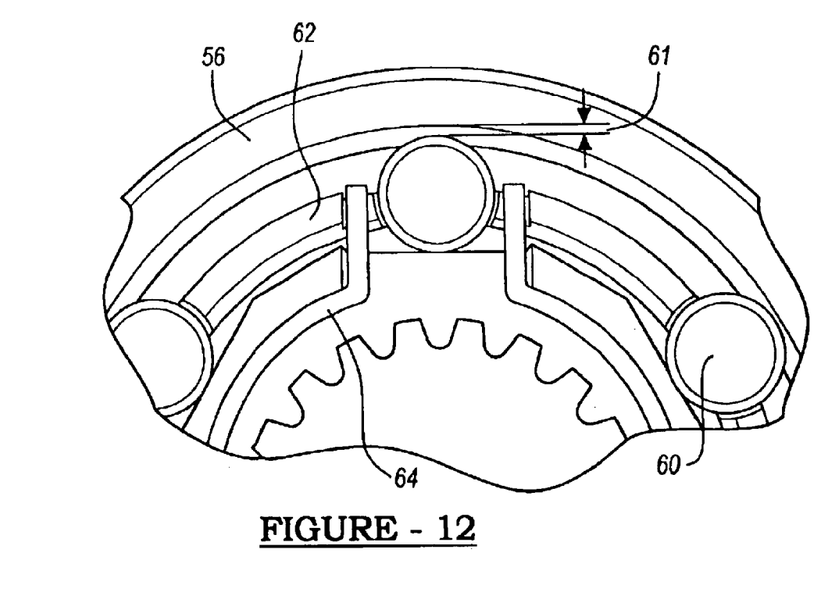
FIG. 12 is a sectional axial view showing components of the bi-directional clutch in the disengaged mode.

FIGS. 11 and 12 also illustrate the gap 61 needed between each roller in the roller set 60 and the inner circumference of the outer race 56. This gap 61 allows the inner race 58 and the outer race 56 to rotate independent of each other during disengagement of the clutch mechanism 20.

The outer race 56 is connected to the planet carrier 46. The inner race 58 has a cross-section having numerous cammed surfaces 73 or a multi-faceted surface on the outer circumference 74 and a splined or other shaped inner circumference 76 to attach to the electric motor-generator 26 output shaft 34.

Figure 17:
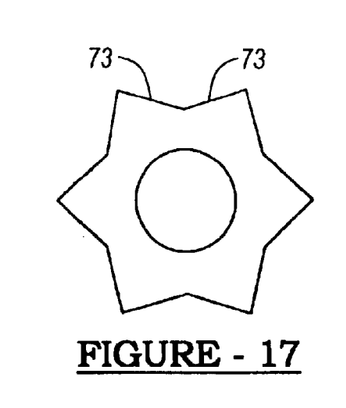
FIG. 17 is an axial view illustrating two cammed surfaces per roller.

Preferably, there is one roller 60 per every four (4)–ten (10) millimeters of the outer race's inner diameter 57. Further, there is one cammed surface 73 corresponding to each roller 60. In other words, there are the same number of rollers 60 and flat cammed surfaces 73. Alternatively, as shown in FIG. 17, there are two cammed surfaces corresponding to each roller.

Figure 8:
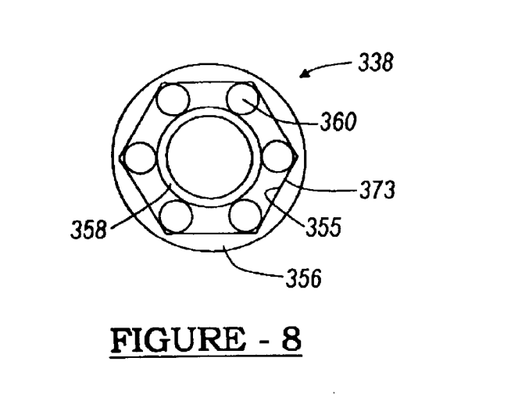
FIG. 8 is an axial view of an alternative embodiment of the bi-directional roller clutch.
Figure 9:
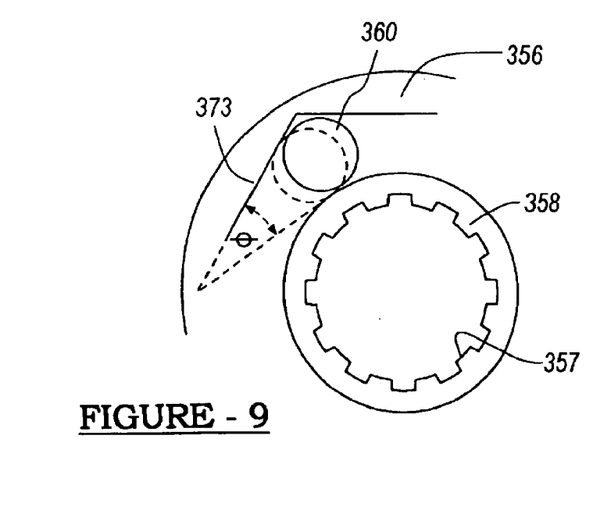
FIG. 9 is a partial axial view of an engaged roller in the bi-directional roller clutch.
Figure 15:
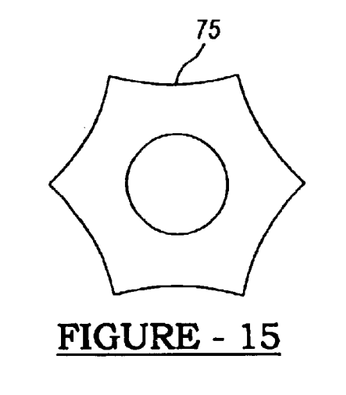
FIG. 15 is an axial view illustrating concave shaped cammed surfaces.
Figure 16:
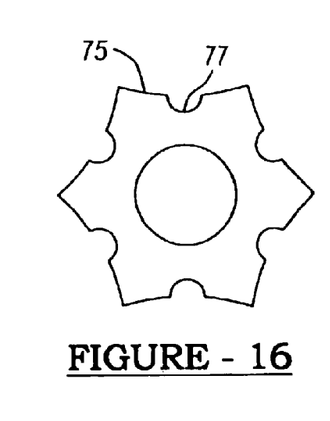
FIG. 16 is an axial view illustrating concave shaped cammed surfaces having one dimple per cammed surface.
Figure 18:
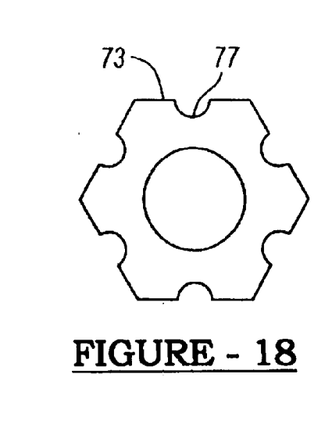
FIG. 18 is an axial view illustrating one cammed surface per roller with a dimpled trough.

Alternatively, as shown in FIGS. 8 and 9, the cross section of the outer circumference of the inner race 358 could be generally circular shaped and the cross section of the inner circumference 355 of the outer race 356 could include cammed surfaces 373. Either embodiment is sufficient so long as the angle, θ, is less than or equal to the arctangent of the coefficient of friction, $\mu$ ($\theta \leq \arctan \mu$). Preferably the angle, θ, falls within the range of 3–6°.

Where there is one cammed surface corresponding to each roller, any of the cammed surfaces whether on the inner race or outer race can be either flat or curved in a concave manner. FIG. 15 illustrates an inner race having curved cammed surfaces 75 around its outer surface. Further, the cammed surface may include a dimple 77 in the center to improve the positioning of the roller. FIG. 16 illustrates an inner race outer surface having curved cammed surfaces 75 with a dimple 77 in the center of the cammed surface. Where there are two cammed surfaces corresponding to each roller, the cammed surfaces whether on the inner race or outer race can be either flat or curved in a concave manner. FIG. 17 illustrates an inner race outer surface having two flat cammed 73 surfaces per roller. FIG. 18 illustrates an inner race outer surface having one flat cammed surface 73 per roller where each flat cammed surface has a dimple 77 in the center.

The inner race 58 is connected to the output shaft 34 of the electric motor 26. The inner race could include splines along its inner circumference 76 for mating with aligned splines on the outer circumference of the electric motor output shaft 34.

Again referring to FIGS. 2 and 3, the roller set 60, including multiple rollers, is positioned between the inner and outer races 58, 56 and is located by the roller cage 62. The centering spring 64 maintains the circumferential position of the roller set 60 and roller cage 62 relative to the cammed surfaces 73 of the inner race 58, preventing clutch lock-up until actuated. The actuation disc 70 is positioned axially by a wave washer 72, resulting in a normally disengaged bi-directional roller clutch 38. The axial position of the centering spring 64 and retaining washer 66 is constrained by the snap ring 68.

The one-way clutch 40 includes a stationary housing 78, the ring gear 42 from the planetary gearset 36, a one-way clutch outer race 80 also referred to as a second outer race 80, a one-way clutch roller set 82 also referred to as a second roller set 82, and a one-way clutch roller cage 84 also referred to as a second roller cage 84. The ring gear 42 essentially acts as an inner race for the second roller set 82. The ring gear 42 has a generally circular-shaped cross section having an inner circumference 86 and an outer circumference 88. The inner circumference 86 is a generally continuous geared circular surface on which the planets run and the outer circumference 88 is generally discontinuous having numerous cammed surfaces 73. Each cammed surface 73 has a first end 90 and a second end 92. Each first end 90 has a wedge angle in the range of 3–6°. Each second end 92 has a curved portion to prevent the rollers 82 from locking in one direction of rotation. The second outer race 80 is attached to the stationary housing 78. The second roller set 82 is positioned between the ring gear 42 and the second outer race 80. The second roller cage 84 is positioned adjacent the second roller set 82 to contain the second roller set 82.

Preferably, the roller set 60 and the second roller set 82 each include at least three cylindrical-shaped rollers. Alternatively, the roller set 60 and the second roller set 82 could each include at least three spherical-shaped rollers. As mentioned previously, preferably the roller set includes one roller per every four (4)–ten (10) millimeters of the outer race's inner diameter. This is also true for the second roller set. In other words, the second roller set preferably includes one roller per every four (4)–ten (10) millimeters of the second outer race's inner diameter.

When the bi-directional roller clutch 38 is disengaged, the electric motor 26 output shaft 34 rotates the sun gear 44. As shown in FIG. 3 the drive direction is clock-wise. Rotation of the sun gear 44 causes the planet gears 48 to rotate in the opposite direction from the sun gear's 44 rotation. Rotation of the planet gears 48 causes the planet carrier 46 to rotate in the opposite direction from the planet gears' 48 rotation. As a result, the electric motor output shaft 34, sun gear 44 and planet carrier 46 all rotate in the same direction. Rotation of the planet carrier 46 causes the engine input 52 to rotate, since the planet carrier 46 is attached to the input 52 of the engine 24.

In this operating mode, the ring gear 42 remains stationary due to its placement in the one-way clutch 40. If the ring gear 42 weren't held stationary, the ring gear 42 would rotate in the direction opposite from the rotation of the electric motor output shaft 34 and sun gear 44. The one-way clutch 40 locks the ring gear 42 to the housing 78, thus preventing rotation of the ring gear 42.

Figure 10:
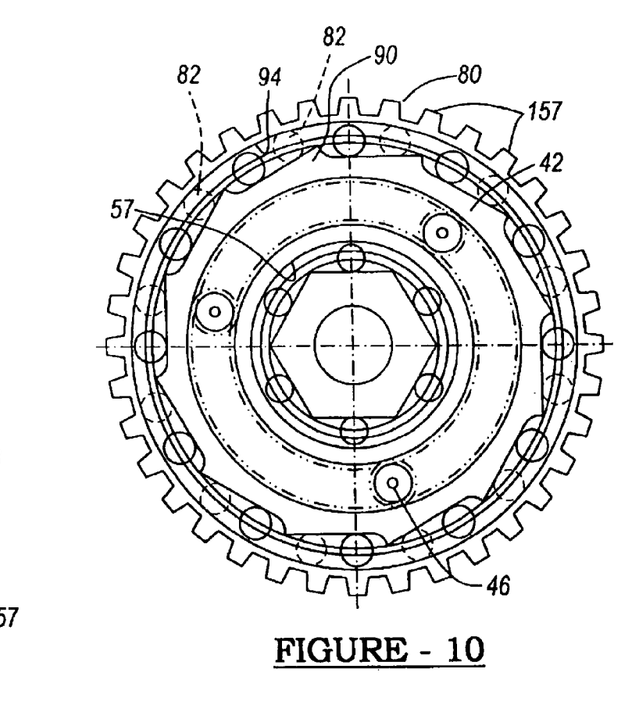
FIG. 10 is an axial view showing the bi-directional clutch and the one-way clutch.

More specifically, as shown in FIG. 10, the ring gear 42 will rotate in the counterclockwise direction just enough to wedge the rollers in the second roller set 82 between the wedge angled ends 90 of the cammed surfaces in the outer circumference 88 of the ring gear 42 and the inner circumference 94 of the second outer race 80. The position of the wedged rollers is shown by the dotted lines. When the rollers 82 in the one-way clutch 40 wedge against the second outer race 80, which is fixed to the stationary housing 78, the ring gear 42 is effectively locked from continuing to rotate in the reverse direction.

Speed reduction occurs due to the design parameters of the planetary gearset 36. Therefore, when the bi-directional roller clutch 38 is disengaged, it does not contribute to the speed reduction of the clutch mechanism 20. Explained in another way, the planetary gearset 36 is operating as if the bi-directional roller clutch 38 is not present.

The centering spring 64 maintains the circumferential position of the rollers 60 and roller cage 62 relative to the inner race 58. Therefore, the rollers 60 act in sync with the inner race 58 and do not contact the outer race 56, which rotates with the planet carrier 46. Further, the actuation disk 70 rotates in sync with the inner race 58.

Actuation of the bi-directional roller clutch 38 results in direct drive between the electric motor 26 and the engine 24. In other words, there is no speed increase or reduction between the electric motor 26 and the engine 24. The bi-directional roller clutch 38 is preferably electromagnetically actuated. However, it could also be hydraulically or pneumatically actuated. A controller 28 will initiate and stop actuation whether the bi-directional roller clutch is electromagnetically, hydraulically or pneumatically actuated.

Figures 13, 14:
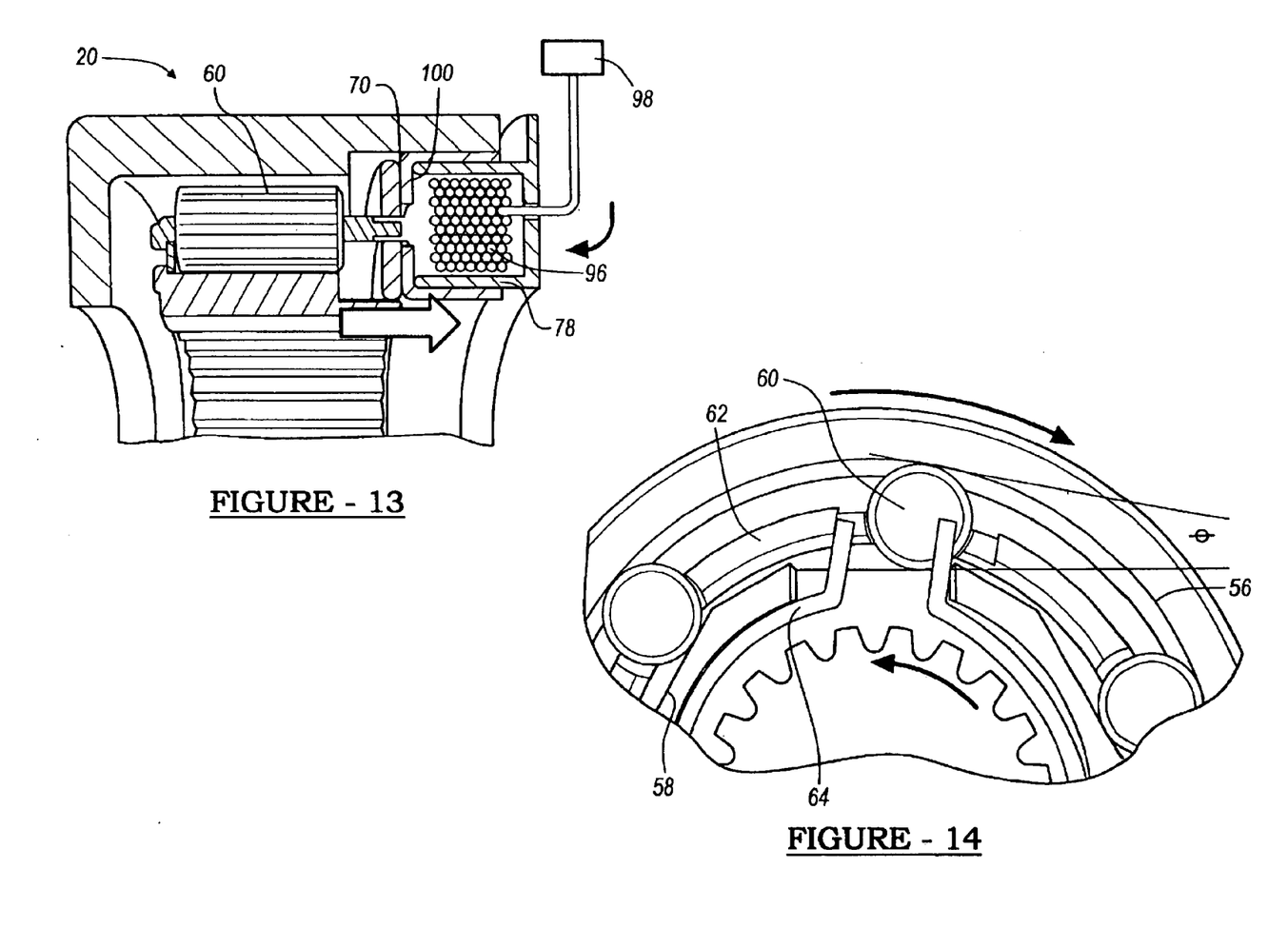
FIG. 13 is a radial view of some components of the first embodiment of the present invention in the engaged mode.
FIG. 14 is an axial view of some of the components of the first embodiment of the present invention in the engaged mode

In the preferred embodiment, illustrated in FIGS. 13 and 14, the clutch mechanism 20 further includes a wire coil 96 that is positioned within the stationary housing 78. A controller 98 will signal an electrical current to be sent to the wire coil 96. When the wire coil 96 receives the electrical current a magnetic field is produced that actuates engagement of the bi-directional roller clutch 38.

The magnetic field draws the actuation disk 70 into contact with an armature surface 100 of the outer race 56, thus overcoming the force of the centering spring 64. The armature surface may be a separate component that is attached to the outer race or it could be an integral component of the outer race.

There is some slight relative movement between the inner and outer races 58, 56 after the actuation disk 70 comes into contact with the armature surface 100. As shown in FIG. 14, the slight movement causes the rollers in the first roller set 60 to become lodged between the inner race 58 and the outer race 56 resulting in lock-up or engagement of the bi-directional clutch 38. As a result, the inner race 58 and outer race 56 are locked together and rotate at the same speed. Therefore, direct drive results since the electric motor output 34 drives the inner race 58 which rotates in sync with the outer race 56. The outer race 56 is attached to the planet carrier 46 and the planet carrier 46 is attached to the input of the engine 52.

Since the sun gear 44 is attached to the inner race 58 and the planet carrier 46 is attached to the outer race 56, the sun gear 44 and the planet carrier 46 rotate at the same speed when the clutch is engaged. When the one-way clutch 40 becomes disengaged, the reaction of the ring gear 42 is to rotate in the reverse direction.

The clutch mechanism will remain engaged until the bi-directional roller clutch is de-activated. In this embodiment, the bi-directional roller clutch will de-activate when there is no electrical current flowing through the wire coil 96. Upon deactivation, the clutch mechanism disengages and will revert to operating at the preset gear ratio.

In the second embodiment, shown in FIGS. 4 and 5, the bi-directional roller clutch 138 links or acts between the ring gear 42 and the sun gear 44. Similar to the first embodiment, the output of the electric motor/generator 34 is connected to the inner race 158 of the bi-directional roller clutch 138 and the sun gear 44. However, the outer race 156 of the bi-directional clutch 138 is connected to the ring gear 42 of the planetary gearset 36. In the second embodiment, the ring gear 42 is also set in a grounded one-way,clutch 40. The planet carrier 46 is connected to the engine's driveshaft 52.

In the third embodiment, shown in FIGS. 6 and 7, the bi-directional roller clutch 238 links or acts between the planet carrier 46 and the ring gear 42. The output of the electric motor/generator 34 is connected to the sun gear 44. The inner race 258 is supported by bearings 259 and is connected to the carrier 46. The carrier 46 is connected to the engine's driveshaft 52. The ring gear 42 is connected to the grounded one-way clutch 40 and also to the bi-directional clutch's outer race 256.

As mentioned previously, the engine 24 can drive the electric motor 26 when the clutch mechanism 20, 120, 220 is disengaged for all three embodiments. In this operating mode the power could flow in both directions. Specifically, the output from the engine 24 drives the electric motor 26 through the clutch mechanism 20, 120, 220 resulting in a speed increase. Preferably the speed increase is the inverse of the predetermined gear ratio or 3:1 (three to one). In other words, the electric motor 26 is rotating three times faster than the engine 24. This configuration is useful with certain alternator/generators that have low performance at lower operating speed which are expected to be encountered when the engine is idling.

There are two possible switching arrangements for each of the possible electromechanical two-way roller clutch arrangements. The first arrangement was discussed above and utilizes an open clutch and de-energized coil to achieve the higher drive ratio. This arrangement requires that the coil be energized, causing the actuation disc to engage the armature of the outer race. Engagement of the actuation disc causes the two-way or bi-directional roller clutch to lock thus achieving a direct drive ratio. A spring 72 will bias the actuation disc away from the armature surface of the outer race.

In the second arrangement, the coil is energized to unlock the two-way roller clutch to achieve the predetermined drive ratio. The coil is de-energized to engage the two-way roller clutch to achieve the direct drive ratio. The second arrangement will reduce parasitic losses, as the coil will be de-energized in the most common operating speed ranges. The second arrangement also has the added benefit of always being in direct drive during engine braking and therefore offers better regenerative braking.

Disengaging the actuation disc, and therefore the two-way roller clutch, by energizing the coil can be achieved by: 1) spring loading the actuation disc against the armature to provide the necessary friction when the coil is not energized while allowing the energized coil's magnetic flux to pull the actuation disc off the armature, disconnecting the clutch; or 2) installing a cam mechanism that pushes the actuation disc away from the armature when the coil is energized. In these cases, a spring will load the actuation disc against the armature when the coil is not energized.

The speed of the motor-generator can be adjusted to minimize relative speed differences across the two-way clutch during engagement and to facilitate disengagement. The speed and function of the motor/generator could be modulated, temporarily changing from a generator to a motor to match the speed of the engine when changing from 1:1 drive to overdrive speed, then changing back to a generator to supply electric power. Controlling the speed of the motor-generator will help increase roller clutch durability and eliminate any noise, vibration and harshness (NVH) associated with the engagement of the clutch.

Special materials are used for the one-way and two-way clutch races, preferably tool steels such as A2, carburized steels such as SAE8620, through-hardened steels (SAE 52100) or induction hardened medium carbon steels (e.g. SAE1045 or 1053), air-hardened Ovako steels such as 677, 477 and 277, and medium to high density and surface-densified powdered metal materials. Other materials with hardness of Rc>55 can also be used.

As shown in FIG. 10, splines 157 can be positioned on the hardened external surface of the one-way clutch, allowing the raceway to be pressed into the housing. The housing can be made from a softer steel or even aluminum. The splines will allow reaction torque to be transferred to the stationary housing. Alternatively, the outer race can be press fit into the housing for low torque applications.

While the above description constitutes the preferred embodiment of the present invention, it will be appreciated that the invention is susceptible to modification, variation and change without departing from the proper scope and fair meaning of the accompanying claims.

What is claimed is:

1. A and clutch system for a hybrid vehicle having an engine with a crankshaft and an electric motor with an output, said system comprising:

a stationary housing;

a planetary gearset coupled between the crankshaft and the output and adapted to provide a non-direct drive connection between the crankshaft and the output, the planetary gear set including a sun gear, a ring gear located concentrically with the sun gear, and a planet gear located and coupled between the sun gear and the ring gear;

a first clutch coupled between the crankshaft and the output, said first clutch being a bi-directional roller clutch that is selectively engageable to provide a direct drive connection between the crankshaft and the output; and a second clutch coupled between the ring gear and the stationary housing, said second clutch being a one-way roller clutch adapted to allow rotation of the ring gear relative to the vehicle in a first direction and to prevent rotation of the ring gear relative to the vehicle in an opposite direction.

2. The invention of claim 1 wherein said second clutch is adapted to allow rotation of the ring gear when the first clutch provides the direct drive connection.

3. The invention of claim 1 wherein the first clutch includes a first race connected to one of the crankshaft and the output and having a generally faceted surface, a second race located concentrically with the first race, connected to the other of the crankshaft and the output, and having a cylindrically shaped surface, and a roller set positioned between the first race and the second race and adapted to provide selective engagement and disengagement of the first race and the second race.

4. The invention of claim 3 wherein the generally faceted surface includes at least three cammed surfaces and the roller set includes at least three rollers.

5. The invention of claim 4 further comprising a roller cage connected to the rollers and adapted to maintain position of the rollers relative to each other.

6. The invention of claim 5 further comprising a centering spring coupled to the roller cage and the faceted surface of the first race and adapted to bias the roller cage and the rollers to rotate with the faceted surface.

7. The invention of claim 6 further comprising means for selectively engaging the second race and the roller cage.

8. The invention of claim 6 further comprising:
   an electromagnetic coil adapted to selectively create an electromagnetic field;
   an armature coupled to the second race and adapted to conduct the electromagnetic field; and
   an activation disk coupled to the roller cage and adapted to move between a disengaged position, in which the actuation disk is disengaged with the second race, and an engaged position, in which the actuation disk is engaged with the second race, based on the presence of the electromagnetic field.

9. The invention of claim 8 further comprising a controller adapted to selectively actuate the electromagnetic coil.

10. The invention of claim 8 further comprising a spring member adapted to bias the actuation disk into the disengaged position in the absence of the electromagnetic field.

11. The invention of claim 1 wherein the first race is connected to the crankshaft and the second race is connected to the output.

12. The invention of claim 11 wherein the second race is located concentrically outside the first race.

13. The invention of claim 1 wherein the planet gear is connected to the crankshaft.

14. The invention of claim 13 wherein the ring gear is connected to the output.

15. The invention of claim 1 wherein the sun gear is connected to the crankshaft.

16. The invention of claim 15 wherein the planet gear is connected to the output.

17. The invention of claim 15 wherein the ring gear is connected to the output.

* * * * *